United States Patent Office 3,526,613
Patented Sept. 1, 1970

---

3,526,613
PHOSPHORUS CONTAINING
REACTION PRODUCTS
Johannes Reese, Wiesbaden-Biebrich, and Kurt A. Kraft,
Wiesbaden-Dotzheim, Germany, assignors to Chemische
Werke Albert, Wiesbaden-Biebrich, Germany, a corporation of Germany
No Drawing. Filed Oct. 18, 1967, Ser. No. 676,053
Claims priority, application Germany, Oct. 20, 1966,
C 40,452
Int. Cl. C08f 19/00, 41/00
U.S. Cl. 260—78.5     9 Claims

ABSTRACT OF THE DISCLOSURE

Reaction products of certain organic polycarboxylic acids with certain polycyclic phosphites, polyesters containing them, products, moulding compositions or shaped bodies prepared therefrom, and a process for their manufacture.

---

This invention is concerned with improvements in or relating to phosphorus containing reaction products. In particular the invention is concerned with reaction products of polycyclic phosphites with organic polycarboxylic acids which reaction products may or may not be polymeric.

The invention thus provides reaction products of organic polycarboxylic acids with polycyclic phosphites of the formula

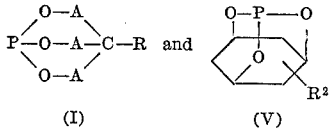

(I)      (V)

wherein A represents an alkylene radical containing not more than 2 carbon atoms which may be substituted with one or more alkyl, cycloalkyl, aryl, alkoxyalkyl, alkoxyaryl and/or hydroxyalkyl radicals, and R and $R^2$ represent an acyclic or cyclic hydrocarbon radical which may be substituted by a hydroxyalkyl, alkoxyalkyl, cycloalkoxyalkyl, aryloxyalkyl, acyloxyalkyl, aroyloxyalkyl, aroyloxyaryl, aryloxyaryl, alkoxyaryl, acyloxyaryl or aryloxyarylalkyl radical.

When using compounds of Formula I, these on reaction with organic dicarboxylic acids react, to illustrate the simplest case, as follows

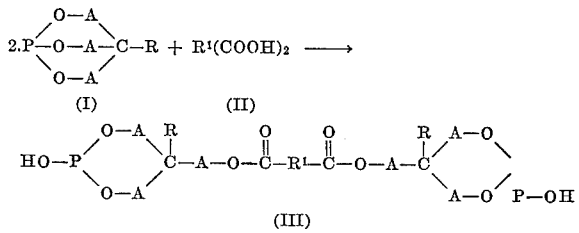

in which $R^1$ represents an aliphatic, cycloaliphatic or aromatic hydrocarbon radical with 2 to 20 carbon atoms which may if desired be substituted by halogen atoms, preferably chlorine or bromine, that are not accessible to the Michaelis-Arbusow reaction, or by alkyl, cycloalkyl, aryl, alkoxyalkyl, alkoxyaryl and/or hydroxyalkyl groups. As is known the Michaelis-Arbusow reaction is the reaction of phosphorous acid trialkylesters with alkylhalides to obtain esters of the monoalkyl-phosphonic acid according to the equation

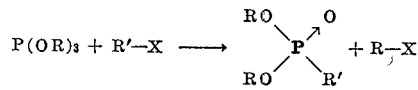

The dioxaphosphorinane rings contained in the reaction product (III) may possibly react with further polycarboxylic acid accompanied by ring opening. In general, 1 mol of the phosphite is reacted with at least one, for example 1 to 2, carboxyl group equivalents. However, not all the carboxyl groups of the polycarboxylic acid used react as is indicated by the following equation:

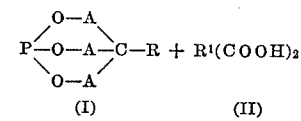

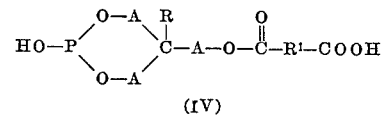

Therefore an excess of for example up to 5 or 10 carboxyl group equivalents in the form of polycarboxylic acids may be used per mol phosphite. For example, 3 equivalents may be used in the case of trimellitic acid, 4 in the case of pyromellitic acid and 6 in the case of mellitic acid. Again, 10 equivalents may be used in the case of an oligomer from 10 mol of (meth)acrylic acid. Also, mixtures of bicyclic phosphites may be reacted with polycarboxylic acids or with mixtures thereof.

In the Formulae I to IV, A represents an alkylene radical (which may be substituted) with no more than 2 carbon atoms, preferably a methylene radical. One or more of the alkylene groups may be substituted by alkyl, cycloalkyl, aryl, alkoxyalkyl, alkoxyaryl and/or hydroxyalkyl groups, the sum of the substituents on each alkylene group preferably being not more than 8 carbon atoms. The radicals A may have the same or different significance. In place of the bicyclic phosphite of Formula I, a compound in accordance with Formula V above may be used.

In the Formulae I to V, R and $R^2$ represent an acyclic or cyclic hydrocarbon radical which may be substituted for example by a hydroxyalkyl, alkoxyalkyl, cycloalkoxyalkyl, arylhydroxyalkyl, acylhydroxyalkyl, aroylhydroxyalkyl, aroylhydroxyaryl, arylhydroxyaryl, alkoxyaryl or acylhydroxyaryl radical and which contains in total not more than 30 and preferably less than 20 carbon atoms. Aliphatic or cycloaliphatic radicals A, R and $R^2$ may be mono- or poly-olefinically unsaturated. The radicals A, R and $R^2$, especially the aromatic ones, may also contain halogen atoms so long as these are not accessible to the Michaelis-Arbusow-reaction under the reaction conditions. For example, the cyclic phosphites may have the structure V or that of 1,1,1 - trimethylolethane, 1,1,1-trimethylolpropane, 1,1,1-trimethylolbutane, 1,1,1 - trimethyloloctadecane, or of pentaerythrithol or its monoethers or monoesters.

If A, R or $R^2$ contain hydroxyl groups, these are esterified by excess carboxyl groups during the reaction in accordance with the invention.

$R^1$ is a bi- or polyvalent radical which may be of aliphatic, cycloaliphatic, mixed aliphatic-cycloaliphatic, aromatic, mixed aliphatic-aromatic, mixed cycloaliphatic-aromatc or mixed aliphatic-cycloaliphatic-aromatic nature. This radical can furthermore be substituted by alkoxy, aryloxy, cycloalkoxy, acylhydroxy, aroyloxy, hydroxy groups and/or halogen not accessible to the Michaells-Arbusow-reaction, especially by chlorine and/or bromine.

As polycarbocylic acids, for example those with 4 to 60 carbon atoms, especially those with up to 20 or 30 to 50 carbon atoms, for example saturated aliphatic dicarboxylic acids with at least 4 carbon atoms, unsaturated aliphatic dicarboxylic acids in which the carboxyl groups are separated from the double bond by at least one carbon atom each, aliphatic, cyclo-aliphatic, aromatic and aromatic-aliphatic polycarboxylic acids especially with one or two benzene nuclei, are suitable for the reaction. Such polycarboxylic acids contain 2 to 6 carboxyl groups, for example. They may also contain olefinic linkages. Aromatic radicals may also contain conventional substituents such as alkyl radicals with for example 1–4 carbon atoms. Carboxyl group-containing saturated or unsaturated polyesters from polyhydroxy compounds especially glycols with 2 to 10 carbon atoms and the above-mentioned polycarboxylic acids, for example polyesters from one mol of a glycol and two mols of a polycarboxylic acid like ethylene glycol-succinic acid polyester, bis(glycol)-polyester of pyromellitic acid, polymers and co-polymers of carboxyl group containing monomers, for example $\alpha,\beta$-unsaturated carboxylic acids, such as (meth)acrylic acid, maleic acid, itaconic acid, may also be employed. Polycarboxylic acids of the above-named variety which contain groups that, under the reaction conditions defined, do not permit a different course of the reaction with bicyclic phosphites or only to a minor extent may also be used. Suitable polycarboxylic acids are, for example, those with oxygen bridges in the C-chain, with alkoxy groups, arylhydroxy groups, acylhydroxy groups, aroylhydroxy groups or those halogen atoms that do not enter a Michaelis-Arbusow reaction. Examples of such polycarboxylic acids are succinic acid, muconic acid, hexane tricarboxylic acid, adipic acid, sebacic acid, $\alpha$-octylnonane dicarboxylic acid, $\alpha$-nonyloctane dicarboxylic acid, dimeric fatty acids, for example dimeric or trimeric linseed oil fatty acids with 36 or 54 carbon atoms, dimeric fatty acids linked through styrene with for example 40 to 50 carbon atoms, dicarboxylic acids which were formed during paraffin oxidation and which may for example have more than 20 carbon atoms, hexahydrophthalic acid, $\Delta$3-tetrahydrophthalic acid, phthalic acid, isophthalic acid, terephthalic acid, tri- or pyromellitic acid, mellitic acid, naphthalene dicarboxylic acid, diphenylylethertetracarbocylic acid, tetrabromophthalic acid, tetrachlorophthalic acid, endomethylenetetrahydrophthalic acid, hexachloroendomethylene tetrahydrophthalic acid, methoxy succinic acid, methoxy phthalic acid, diphenyldicarboxylic acid, diphenylether dicarboxylic acid, diglycolic acid, benzoyl malic acid, phenylene diacetic acid, dihydroxy diphenylmethane-O,O-diacetic acid, naphthalene tetracarboxylic acid, butadiene tetracarboxylic acid, butane tetracarboxylic acid, cyclohexanonetetracarboxylic acid, acetohydroxynaphthalene dicarboxylic acid, benzoyl tartaric acid, ketone dicarboxylic acids, such as benzophenonedicarboxylic acid, hydroxycarboxylic acids, for example $\beta$-hydroxyglutaric acid or mixtures of two or more thereof.

The reaction is generally carried out at temperatures between 50 and 300° C., preferably between 100 and 200° C., and usually at normal pressure. If necessary, a vacuum of for example 0.1 to 200 mm. mercury is used towards the end of the reaction. In many cases, it is of advantage to pass inert gases e.g. nitrogen or carbon dioxide over the reaction mixture. The components may be reacted in the absence or presence of solvents. Suitable solvents are for example aliphatic, cyclo-aliphatic or aromatic hydrocarbon or ethers, aromatic chlorinated hydrocarbons, aliphatic or cycloaliphatic ketones. Examples of such solvents include: toluene, xylene, chlorobenzene, dibutyl ether, tetra or decahydronaphthalene, cyclohexanone or mixtures of two or more such solvents.

To accelerate the reaction, catalysts may be added. Catalysts which may be used include Lewis acids e.g. $AlCl_3$, $BF_3$, $ZnCl_2$, $SnCl_4$ and $TiCl_4$ primary and secondary phosphites, acid phosphonates, phosphonic acids, primary and secondary phosphates and also phosphoric acid.

The phosphorus containing compounds produced in accordance with the invention have, in general, only a slight intrinsic colour are usually obtained as viscous to highly viscous liquids or even solid resins. They have moderate to good solubility in many conventional solvents such as alcohols, ketones, ethers and some also soluble in hydrocarbons such as toluene, xylene and styrene. Since they contain secondary phosphite groups, they can also be dissolved in dilute aqueous alkalis.

Because of their characteristics, the reaction products of the invention may be used for a wide variety of purposes. Some may find application as pesticides, other as flame retardant additives for unsaturated polyesters, polystyrene, polyurethanes, phenolic resins and foams thereof. It is possible that the addition products in accordance with the invention may impart flame retardant and/or antistatic properties to the substances to which they are added.

Because of their free OH— and/or COOH groups, the reaction products in accordance with the invention are especially suitable for incorporation into polycondensation products, for example in polyester resins, polyurethanes, polyamides and/or polyepoxy compounds. Because of the chemical incorporation into these substances, they cannot be removed so readily from the molecular structure as additives known hitherto. This is particularly important for the production of compositions, especially for preparing shaped bodies, especially moulding compositions, moulded articles and for enhancing their physical properties.

The invention also relates to the production of a product based on polyesters having improved flame retardant properties. This means that the products may be a polyester or a product prepared therefrom as the result of incorporation by chemically built-in—e.g. by reaction of their free hydroxy groups—and/or by simple admixture of reaction products in accordance with the invention. It is also possible to produce the polyesters, of which at least 25 mol percent of the alcohol component and/or preferably the acid component are olefinically unsaturated, in the presence of the reaction products in accordance with the invention.

To prepare these polyesters, an esterification mixture is normally used which contains the reaction products in accordance with the invention in such an amount that, calculated on a reaction of at least 90% of the reaction mixture, a phosphorus content of 0.07 to approximately 3.8 percent by weight, preferably 0.6 to 1.7 percent by weight, is obtained in the polyester. For example, esterification mixtures can be prepared that contain compounds of Formula III. If succinic acid is selected for this as acid component, then for these compounds a phosphorus content of approximately 13% is obtained. These compounds in accordance with Formula II can be incorporated or mixed into the esterification mixture in an amount of up to approximately 20% by weight. This would correspond to a maximum phosphorus content of approximately 3.8 percent by weight.

Apart from the reaction products in accordance with the invention, the polyesters may additionally contain compatible halogen-containing compounds that can be chemically incorporated or that can be mixed with the polyester, with a halogen content of 6 to 25, preferably 10 to 20 percent by weight. Suitable halogen-containing compounds are for example, carboxylic acids (preferably polycarboxylic acids) or their anhydrides, where such exist, such as hexachloroendomethylene tetrahydrophthalic acid, tetrabromophthalic acid, dichlorophthalic acid or dibromobenzoic acid, halogen-containing alcohols or halogen-containing polyfunctional phenols or the like.

The invention also relates to moulding compounds that contain the reaction products in accordance with the invention. Such moulding compounds may contain unsaturated polyesters, copolymerisable monomers, catalysts, accelerators, possibly fillers, dyestuffs and other conventional additives as well as the reaction products in accordance with the invention in admixture or in chemical combination in such an amount that the phosphorus content of the moulding compounds in advantageously 0.03 to 2.5, preferably at least 0.5% by weight. These moulding compounds may additionally contain halogen compounds in such an amount that the halogen content is 5 to 20, preferably 8 to 15, percent by weight. Because of the reduction of the halogen content in comparison to those amounts that would be necessary without the phosphorus-containing reaction products in accordance with the invention, a considerable reduction in specific gravity is achieved. Also, the lesser halogen content has a favourable effect on the mechanical properties of the moulding products from the compound.

The addition products are also suitable for the treatment, especially impregnation, of organic fibre materials. In this field, they offer the advantage that the adducts may be available in liquid form so that the use of solvents is not always necessary. However, after the addition of solvents, they may be used in solution. For example, mineral fibres, e.g. asbestos, slag wool, or glass fibres, natural or synthetic fibres, paper, cardboard, wood fibres, textiles etc. or the like can be treated with the products obtained in accordance with the invention. The fibrous materials treated in this manner, have a variety of uses, for example in the form of glass fibres as reinforcement inserts in the production of laminates based on unsaturated polyester resins when the adducts improve the adhesion of the fibres to the polyester resin or as insulating material, for example in the building industry. The addition products may moreover be used to protect metals against corrosion e.g. in the form of surface coating compositions for example paints, lacquers and the like. In the form of additives to the abovementioned resins they may also be employed as electrical insulating material in certain cases.

Since the addition products prepared in accordance with the invention significantly improve the adhesive strength of polyesters, such mixtures may be used as fillers and/or knifing compounds possibly also after addition of pigments. They are, for example, also suitable for use in the manufacture or repair of building components and for the filling of damaged parts, such as holes, tears, cracks or of recesses. In particular, they may also be employed as coatings or for the repair of concrete components.

In order that the invention may be well understood the following examples are given by way of illustration only:

EXAMPLE 1

730 g. (5 mol) adipic acid are heated with 1620 g. (10 mol) bicyclic trimethylolpropane phosphite at 180° C. until only traces of bicyclophosphate are revealed in the reaction mixture. These are removed from the reaction mixture by the application of a vacuum at 170° C. There remain 2346 g. of a highly viscous clear substance.

Phosphorus content.—Found: 13.09%. Calculated: 13.18%.

EXAMPLE 2

830 g. (5 mols) isophthalic acid are heated with 1620 g. (10 mols) bicyclic trimethylolpropane phosphite and 270 g. xylene for 6 hours to 190° C. Thereafter, the temperature is increased to 215° C. within 2 hours, the xylene being distilled off and the reaction mixture, which becomes more and more viscous, stirred for 14 hours at this temperature. After cooling to 190° C., the residual xylene is removed under vacuum. In the yellowish hard resin formed, only traces of the starting materials can be confirmed by thin layer chromatography.

Yield: 2382 g.=97.4% of the theoretical.

EXAMPLE 3

1945 g. (5 mols) hexachlorendomethylene tetrahydrophthalic acid are heated with 1620 g. (10 mols) trimethylylolpropane bicyclic phosphite and 500 ml. xylene at 150° C. until only traces of the bicyclophosphite are revealed in the reaction mixture. After distilling off the solvent and a small amount of an unidentified substance, a brittle, resinous, yellowish substance remains.

Yield: 3416 g.=96% of the theoretical.

EXAMPLE 4

516 g. (3 mols) hexahydrophthalic acid and 888 g. (6 mols) bicyclic trimethylolethane phosphite are heated at 180 to 200° C. under stirring until no bicyclic phosphite is present anymore in the reaction mixture. After cooling to room temperature a slightly yellowish, clear soft resin is obtained. The yield is practically quantitative.

EXAMPLE 5

1180 g. (10 mols) succinic acid, 1480 g. (10 mols) bicyclic trimethylolethane phosphite and 150 g. dichlorobenzene are heated at 170° C. until there are only traces of bicyclic phosphite in the reaction mixture. The viscosity of the mixture is essentially increased during this reaction. After distilling off the solvent a colourless soft resin having the appearance of a gel is obtained. The yield is quantitative.

EXAMPLE 6

415 g. (2.5 mols) ortho-phthalic acid, 810 g. (5 mols) bicyclic trimethylolpropane phosphite and 0.6 g. aluminium chloride are heated at 166 to 170° C. The reaction mixture becomes turbid and the hydrogen chloride begins to be split off. When the hydrogen chloride formation has ceased a highly viscous, opalescent reaction product is obtained. After distilling off a small quantity of phthalic acid anhydride in vacuo at 170° C. the reaction product has a final weight of 1210 g.=98% of the theoretical.

EXAMPLE 7

482 g. (1 mol) tetrabromphthalic acid and 296 g. (2 mols) bicyclic trimethylolethane phosphite are heated at 180 to 185° C. while stirring well. During this reaction the mixture becomes yellow. As soon as no bicyclic phosphite may be detected by thin-layer chromatographic methods the mixture is cooled to ambient temperature. 776 g., i.e., the quantitative yield of a clear, yellow resin are obtained. Its bromine content is about 41%.

EXAMPLE 8

174 g. (1 mol) octanedioic acid and 148 g. (1 mol) bicyclic trimethylolethane phosphite are heated at 190 to 200° C. until the phosphite has completely reacted. As soon as a small sample of the reaction product solidifies completely clear at room temperature, the reaction is interrupted and the reaction product is cooled. A colourless, clear polyaddition product in a practically quantitative yield is obtained.

EXAMPLE 9

176 g. (1 mol) bicyclic phosphite of the triol

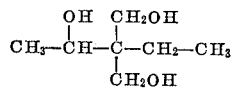

are melted together with 59 g. (0.5 mol) succinic acid. The homogenized mixture is cautiously heated at 170 to 180° C. until a sample does no longer solidify in a crystal-

What we claim is:

1. Compounds having the formula

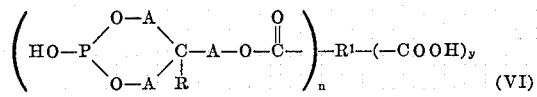

(VI)

or

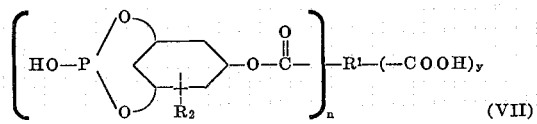

(VII)

being reaction products of organic polycarboxylic acids of up to 20 carbon atoms and up to 6 carboxylic groups with polycyclic phosphites of one of the formulae

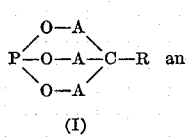 and 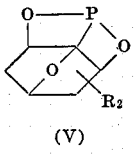

(I)     (V)

wherein

A represents a substituent selected from the group consisting of alkylene radicals containing not more than 2 carbon atoms, alkylene radicals containing not more than 2 carbon atoms substituted with at least one of the following substituents having up to 6 carbon atoms: alkyl, cycloalkyl, aryl, alkoxyalkyl, alkoxyaryl, hydroxyalkyl and halogen derivatives thereof and R and $R^2$ each represent a substituent containing not more than 30 carbon atoms selected from the group consisting of hydrocarbon radical and hydrocarbon radical substituted by at least one of the substituents hydroxyalkyl, alkoxyalkyl, cycloalkoxyalkyl, aryloxyalkyl, acyloxyalkyl, aroyloxyalkyl, aroyloxyaryl, aryloxyaryl, alkoxyaryl and acyloxyaryl radical, $R^1$ represents a bi- to sixvalent aliphatic, cycloaliphatic, mixed aliphatic-cycloaliphatic, mixed aliphatic-aromatic, mixed cyclo-aliphatic-aromatic or mixed aliphatic-cycloaliphatic-aromatic hydrocarbon radical with 2 to 60 carbon atoms which may be substituted by alkyl, alkoxy, alkoxyalkyl, hydroxyalkyl, acyloxy groups with 1 to 4 carbon atoms; cycloalkyl, cycloalkoxy groups; aryl, alkoxyaryl, aryloxy, aroyloxy groups; hydroxy groups or halogen, n is an integer from 1 to 6, y is an integer from 0 to 5 and wherein $(n+y)$ being not less than 2 and not more than 6.

2. Reaction products according to claim 1 wherein A represents a —$CH_2$— group.

3. Reaction products according to claim 1, wherein R and $R^2$ each contain not more than 20 carbon atoms, are aromatic and contain halogen atoms that are not accessible to the Michaelis-Arbusow reaction.

4. Reaction products according to claim 1, wherein R and $R^2$ are olefinically unsaturated.

5. Reaction products of the formula

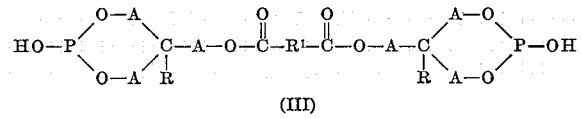

(III)

wherein $R^1$ means a hydrocarbon radical with 2 to 20 carbon atoms and wherein R means a hydrocarbon radical of not more than 30 carbon atoms.

6. A process for the manufacture of the reaction products of claim 1, in which one mol of phosphite is reacted with 1 to 2 carboxylic group equivalents of polycarboxylic acid in the presence of at least one solvent at a temperature between 50 and 300° C.

7. A process according to claim 6 wherein said solvents are polar.

8. A process according to claim 6 wherein the reaction is performed in the presence of a catalyst.

9. A process according to claim 6 wherein a vacuum is applied towards the end of the reaction.

References Cited

UNITED STATES PATENTS

| | | | |
|---|---|---|---|
| 3,000,850 | 9/1961 | Ainswort | 260—937 XR |
| 3,155,705 | 11/1964 | Emmons et al. | 260—937 XR |
| 3,194,795 | 7/1965 | Friedman | 260—78.5 |
| 3,293,327 | 12/1966 | Hechenbleikner | 260—936 |

JOSEPH L. SCHOFER, Primary Examiner

J. KIGHT III, Assistant Examiner

U.S. Cl. X.R.

167—13; 252—2; 260—18, 937

PO-1050
(5/69)

UNITED STATES PATENT OFFICE
CERTIFICATE OF CORRECTION

Patent No. 3,526,613　　　　　　　　　　Dated Sept. 1, 1970

Inventor(s) Johannes Reese, and Kurt A. Kraft

It is certified that error appears in the above-identified patent and that said Letters Patent are hereby corrected as shown below:

Column 1, line 55, formula III should read as follows:

SIGNED AND
SEALED
NOV 24 1970

(SEAL)
Attest:

Edward M. Fletcher, Jr.
Attesting Officer

WILLIAM E. SCHUYLER, JR.
Commissioner of Patents